June 22, 1965   W. J. TENGELITSCH   3,190,031
TOY CHAIN SAW WITH SIMULATED SAWDUST DISPENSER
Filed Dec. 1, 1961   2 Sheets-Sheet 1

INVENTOR.
WILLIAM J. TENGELITSCH
BY *Hobbs & Easton*
ATTORNEYS

*INVENTOR.*
WILLIAM J. TENGELITSCH
BY
*Hobbs & Caitor*
ATTORNEYS

3,190,031
TOY CHAIN SAW WITH SIMULATED SAWDUST
DISPENSER
William J. Tengelitsch, R.R. 3, Box 262,
Nappanee, Ind.
Filed Dec. 1, 1961, Ser. No. 156,390
8 Claims. (Cl. 46—39)

The present invention relates to a toy saw and more particularly to a portable toy chain saw.

Portable chain saws have become increasingly popular in recent years and are being used extensively in urban and suburban communities as well as in rural and timber areas; consequently, most children have an opportunity to observe tree trimmers and removers from time to time and are fascinated by these saws and the ease and effectiveness with which they are handled by the workman in felling and trimming the trees and cutting the branches and trunks of the removed trees and branches into easily handled sections or sticks. Nevertheless, the only readily visible moving part of this type of saw is the rotating chain blade which is rather unimpressive until it is applied to the wood being cut and the sawdust and chips begin to fly and are thrown from the saw. There has, likewise, been a strong trend in the toy field to simulate power operated equipment, machines and tools, using relatively weak, battery driven electrical motors to operate the toy equipment in much the same manner as the actual equipment is operated without, of course, performing the actual operation. It is, therefore, one of the principal objects of the present invention to provide a power driven toy chain saw which from outward appearance resembles an actual conventional chain saw and which can be operated in much the same manner as the conventional chain saw with similar functions ostensibly being performed.

Another object of the invention is to provide a safe, easily handled toy chain saw which produces both the sight and sound of an actual conventional chain saw and which can be handled and operated in much the same manner and under the same conditions as the conventional saw.

Still another object of the invention is to provide a power driven toy chain saw having a safe, actual rotating "chain" saw blade operated in the same manner as the chain of a conventional chain saw and producing a flow or discharge of "sawdust" from the housing of the saw while the saw is operating.

A further object is to provide a toy saw of the aforesaid type having a discharge opening for the sawdust beneath the housing adjacent the rear end of the chain blade and including a mechanism for driving the blade and simultaneously throwing a stream of sawdust from the opening forwardly beneath the operating chain.

Another object of the invention is to provide a portable toy chain saw resembling in appearance a standard chain saw in most respects except in size, which is relatively simple in construction and operation and which can be operated at low cost by an electrical motor either from a battery or from the standard home current.

Another object of the invention is to provide a toy saw having a means for discharging "sawdust" while the saw is operating, which carries a supply of dust in the housing and which can be controlled to discharge the dust when the saw is in cutting position.

Additional objects and advantages of the invention will become apparent from the following description and accompanying drawings, wherein.

Figure 2:
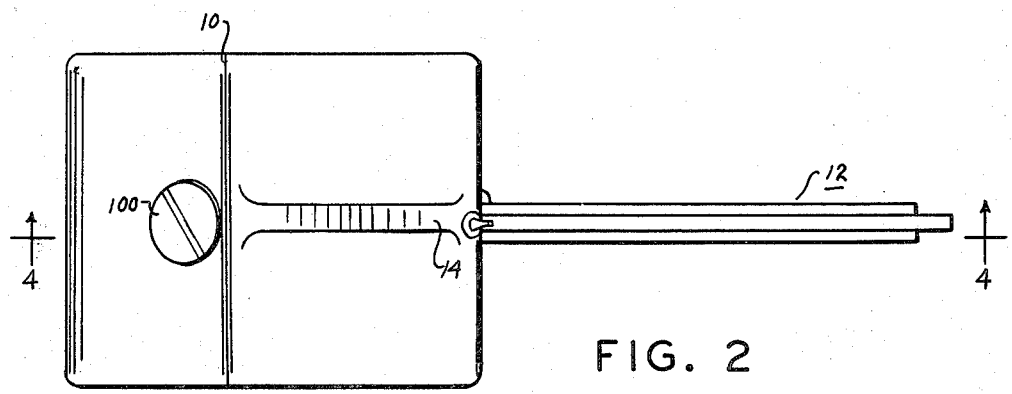
FIGURE 2 is a top plan view of the toy saw shown in FIGURE 1.
Figure 1:
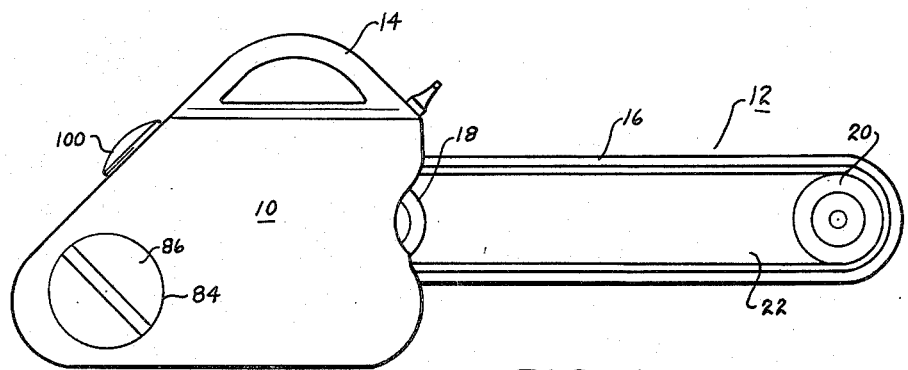
FIGURE 1 is a side elevational view of the present toy chain saw.
Figure 3:
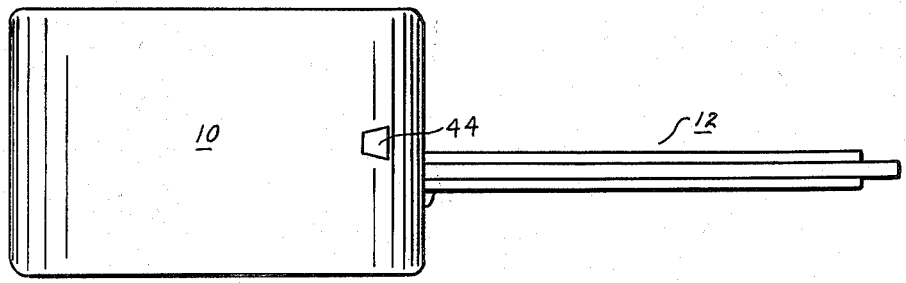
FIGURE 3 is a bottom view of the toy saw shown in FIGURES 1 and 2.

Referring more specifically to the drawings and to FIGURES 1, 2 and 3 in particular, numeral 10 designates the body of the saw, numeral 12 the chain cutting blade thereof projecting forwardly and mounted on body 10, and numeral 14 a handle for lifting, carrying and manipulating the saw. The body or housing 10 and chain saw blade 12 having an outward appearance resembling the conventional chain saw, the body preferably being constructed of plastic molded to substantially the configuration shown and the chain blade preferably being of rubber or flexible plastic material having notches therein to give a configuration having the appearance of teeth of a chain saw. An actual beaded chain or the like may be used in place of the "chain saw" shown, or any other type of endless, chain-like structure may be used. Chain blade 16 is supported on an inner sheave 18 and an outer sheave 20, the latter sheave being supported by a blade supporting structure 22 joined integrally with body 10 and projecting forwardly from the body and rotatably supporting sheave 20 on the outer end thereof on a pin or other suitable bearing 24. Blade 12 may be formed separately from the body portion and secured thereto by any suitable means, and it may be constructed of relatively thin metallic sheet material having sufficient strength to support the chain and the rotatable sheave 20 at its outer end, the blade being rigidly secured to the body and movable in all positions therewith. Sheave 18 is journalled on a pin or shaft 26, which in turn is supported in body 10 in bosses 28 and 30 formed integrally with the front portion of body 10. Sheave 18 may be molded in the body initially, provided it is sufficiently protected during the molding operation to permit it to thereafter rotate, or it may be assembled in the body with pin 26 being slipped lengthwise in boss 30 through passage 32 after the body has been molded and the sheave inserted in the slot provided therein. The manner in which the sheaves are rotatably mounted and assembled in the body may be changed from one design of the present saw to another.

One of the important features of this present invention is the mechanism for discharging a constant stream of "sawdust" while the saw is operating. This mechanism consists of a passage 40 extending from a hopper 42 to an outlet opening 44 in the lower portion of body 10 beneath the chain 16. Thee hopper or chamber 42 is formed by the sidewalls of the body and a partition 46 separating the hopper 42 from chamber 48, housing sheave 18 and the drive mechanism therefor. A roller 50 for forcibly discharging the sawdust through discharge opening 44 is mounted in chamber 48 with its lower edge extending into passage 40 and in substantial contact with the lower surface 52 of the passage. In order to give optimum performance in the discharge of the sawdust and good control thereof during the operation of the saw, roller 50 is preferably covered by a relatively soft, rubber-like material 54 on the periphery thereof. In the structure shown in the drawings, roller 50 is rotatably supported in fixed position in chamber 48 on an electrical motor 60, which in turn is rigidly mounted on boss 62 on the bottom 64 of chamber 48. Both sheaves 18 and 20 and roller 50 are driven by motor 60, sheaves 18 being driven by a gear 66 geared to and rotatable with roller 50, and a gear 68 meshing with gear 66 and secured to and rotating with sheave 18. Roller 50 is mounted on the motor shaft and is driven directly by the motor, and gear 66 which is secured to the roller and rotates therewith drives gear 68 and sheave 18, which in turn drives chain 16 on sheave 20.

A sound simulating that of a gasoline motor used in driving the conventional saw is produced by a series of pins 70 in the side of roller 50 near the periphery thereof and a metal or plastic leaf member 72 secured to wall 46 and extending in the path of pins 70 as roller 50 is rotated by motor 60. In order to increase the intensity produced by the pins 70 and member 72, member 72 may be mounted on a diaphragm or similar means in chamber 48 or along the sidewall thereof.

Motor 60 is driven from a battery 80 housed in body 10 in the lower portion thereof beneath chamber 42, the battery compartment 82 having an opening 84 closed by a screw threaded cap 86 in the side of body 10. The battery is connected to the motor by a suitable circuit, the one shown consisting of lead wires 88 and 90 connected to terminals 92 and 94, respectively. A switch 96 for controlling the operation of the saw is connected into lead 90 and is operated by a push button or the like 98 on the side of body 10, the switch being of conventional construction and operation, and hence not described in detail herein. The battery may be of any suitable, readily available standard type such as dry cell.

When the present toy chain saw is to be used, cap 100 is removed from opening 102, and a supply of prepared sawdust is poured into hopper 42, the dust initially filling passage 40 to roller 50, which in effect closes the passage and prevents the sawdust from leaving the body 10 until the saw is operated. When the saw is to be operated, the operator pushes button 98, thereby closing the circuit from battery 80 through lead 90 to the motor and through lead 88 from the motor to the battery. As the motor operates, it rotates roller 50, gears 66 and 68, thereby driving chain 16 on sheaves 18 and 20. The chain continues to operate as long as the motor is operating. Simultaneously therewith, the sawdust entrapped in passage 40 is drawn beneath roller 50 along the bottom of passage 40 and is discharged with substantial force through discharge opening 44, the sawdust flying forwardly and downwardly in the same manner as the sawdust created by the operation of a conventional chain saw. As the sawdust is withdrawn from the upper end of passage 40, the sawdust in hopper 42 flows downwardly therein, continually supplying the passage and roller with the sawdust for discharge through opening 44 until the supply is exhausted or until the operation of the saw is discontinued by the releasing of control button 98.

As roller 50 is rotated in the foregoing manner to discharge the sawdust, pins 70 continually lift member 72, and release it, permitting it to slap or fall against the next succeeding pin, thereby creating a popping sound, similar to that created by a gasoline engine of the type used in the portable chain saws. If desired, a small closure may be inserted in passage 40 between hopper 42 and roller 50 to permit the saw to operate without discharging the sawdust, thereby simulating the condition under which a conventional saw is idled between cutting operations. A sliding type door, controlled from either the bottom or the side, can perform this function.

Figure 4:
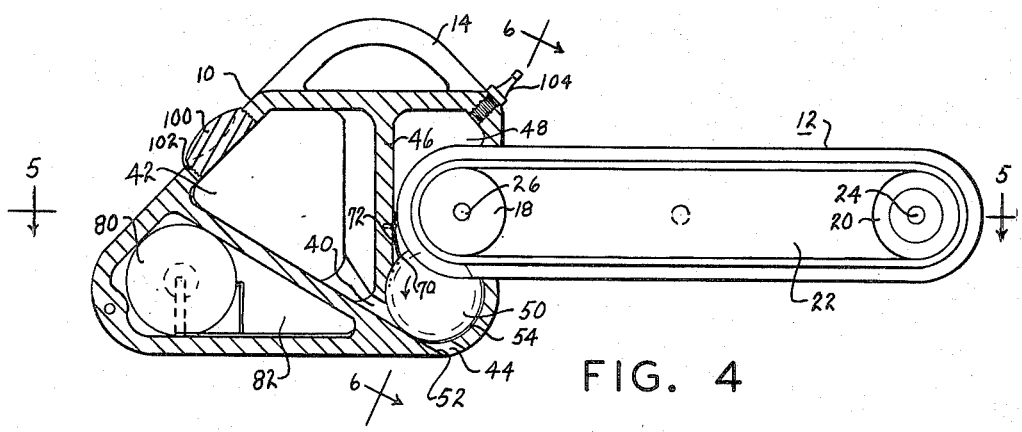
FIGURE 4 is a vertical cross sectional view of the toy saw shown in the preceding figures, taken on line 4—4 of FIGURE 2.
Figure 5:
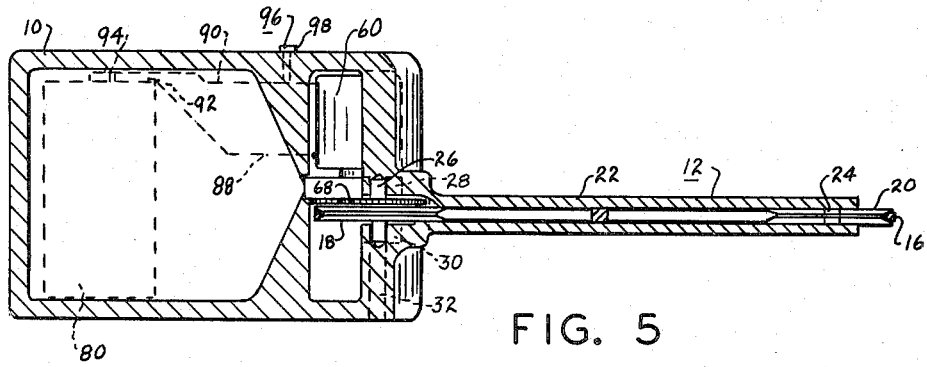
FIGURE 5 is a horizontal cross sectional view of the present saw, taken on line 5—5 of FIGURE 4.
Figure 6:
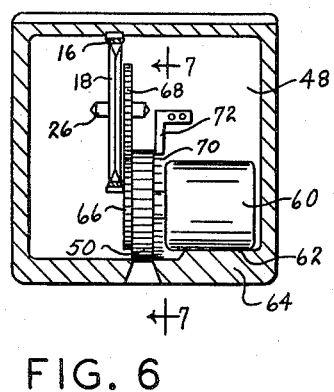
FIGURE 6 is a diagonal cross sectional view of the toy saw shown in the preceding figures, taken on line 6—6 of FIGURE 4.
Figure 7:
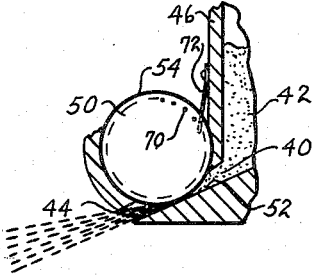
FIGURE 7 is a fragmentary cross sectional view of the toy saw shown in the preceding figures, taken on line 7—7 of FIGURE 6, illustrating the manner in which the sawdust discharging mechanism operates.

While the toy chain saw shown in the drawings is operated by a battery, it may be operated by a standard current connected to motor 60 of suitable rating attached to connectors such as that shown at 104 in FIGURE 4. This type of operation, however, limits the portability and maneuverability of the present toy saw. In some saws, it may be desirable to eliminate the sound mechanism and in others it may be desirable to eliminate the sawdust-producing mechanism while retaining the sound mechanism. Various other changes may be made as desired without departing from the scope of the invention.

I claim:

1. A toy chain saw, comprising a housing having a handle and a chamber for dust, a forwardly extending member attached to said housing, a roller mounted on the forward end of said member, a roller mounted in said housing at the rear end of said member, a chain-like belt on said rollers, a removable cover for said chamber, a passage extending from said chamber to a discharge opening beneath said belt, a wheel extending at its lower portion into said passage, gears interconnecting said wheel and the roller at the rear of said belt, a means including a reed and a series of pins on said wheel contacting said reed for producing a sound simulating that of a gasoline motor used in a chain saw, an electrical motor for driving said wheel and said belt to discharge dust from said passage and to create the aforesaid sound, and a battery in said housing for driving said motor.

2. A toy chain saw, comprising a housing having a chamber for dust, a forwardly extending member attached to said housing, a roller mounted on the forward end of said member, a roller mounted in said housing at the rear end of said member, a chain-like means on said rollers, a removable cover for said chamber, a passage extending from said chamber to a discharge opening beneath said chain-like means, a wheel extending into said passage, drive means interconnecting said wheel and the roller at the rear of said member, a means including a reed and a series of pins associated with said wheel contacting said reed for producing a sound simulating that of a gasoline motor used in a chain saw, and an electrical motor for driving said wheel and said chain-like means to discharge dust from said passage and to create the aforesaid sound.

3. A toy chain saw, comprising a housing having a chamber for dust, a forwardly extending member attached to said housing, a roller mounted on the forward end of said member, a roller mounted in said housing at the rear end of said member, a chain-like means on said rollers, a removable cover for said chamber, a passage extending from said chamber to a discharge opening beneath said chain-like means, a wheel extending at its lower portion into said passage, a drive means interconnecting said wheel and the roller at the rear of said member, an electrical motor for driving said wheel and said chain-like means to discharge dust from said passage, and a battery in said housing for driving said motor.

4. A toy chain saw, comprising a housing having a chamber for dust, a forwardly extending member attached to said housing, a roller mounted on the forward end of said member, a roller mounted in said housing at the rear end of said member, a chain-like means on said rollers, a passage extending from said chamber to a discharge opening adjacent said chain-like means, a wheel extending into said passage, a drive means interconnecting said wheel and the roller at the rear of said member, and means for driving said wheel and said chain-like means to discharge dust from said passage.

5. A toy chain saw, comprising a housing having a chamber for dust, a drivably supported chain-like means extending forwardly from said housing, a member for supporting the forward end of said means, a passage extending from said chamber to a discharge opening adjacent said chain-like means; a rotatable member extending into said passage, and an electrical motor for driving said rotatable member and said chain-like means to discharge dust from said passage.

6. A toy chain saw, comprising a housing having a chamber for dust, a drivably supported chain-like means extending forwardly from said housing, a member for supporting the forward end of said means, a passage extending from said chamber to a discharge opening adjacent said chain-like means, a means associated with said passage for propelling dust therethrough, and a means for operating said last mentioned means and driving said chain-like means.

7. A toy chain saw, comprising a housing having a chamber for dust a drivably supported chain-like means extending forwardly from said housing, a passage extending from said chamber to a discharge opening adjacent said chain-like means, a means associated with said passage for propelling dust therethrough, a means for producing a sound simulating that of a gasoline motor used in a chain saw, and a means for operating said last mentioned means and said dust propelling means and for driving said chain-like means to discharge dust from said passage and to create the aforesaid sound.

8. A toy chain saw, comprising a housing having a chamber for dust, a chain-like means extending forwardly from said housing, a member for supporting the forward end of said means, a passage extending from said chamber to a discharge opening near the lower rear portion of said chain-like means, a means associated with said passage for propelling dust through said discharge opening and forwardly beneath said chain-like means, and a means for operating said last mentioned means.

References Cited by the Examiner

UNITED STATES PATENTS

| 1,462,660 | 7/23 | Rollefson. |
| 2,237,504 | 4/41 | Roath. |
| 2,329,666 | 9/43 | Syverud _____ 222—414 XR |
| 2,737,319 | 3/56 | Rayburn _____ 222—414 XR |
| 2,960,791 | 11/60 | Reed _____ 46—39 |
| 3,036,402 | 5/62 | Hamilton _____ 46—39 |

FOREIGN PATENTS

| 71,491 | 7/59 | France. |
| 581,434 | 8/59 | Canada. |

DELBERT LOWE, *Primary Examiner.*

LEONARD W. VARNER, *Examiner.*